United States Patent [19]
Meadows

[11] 3,987,527
[45] Oct. 26, 1976

[54] WIRE CUTTER-STRIPPER
[75] Inventor: John Meadows, Palo Alto, Calif.
[73] Assignee: Raychem Corporation, Menlo Park, Calif.
[22] Filed: July 7, 1975
[21] Appl. No.: 593,689

Related U.S. Application Data
[62] Division of Ser. No. 442,398, Feb. 14, 1974, Pat. No. 3,916,733.

[52] U.S. Cl. .............................. 29/236; 269/238
[51] Int. Cl.² ..................................... H02G 1/12
[58] Field of Search ................... 269/236, 237, 238; 81/9.51; 29/628

[56] References Cited
UNITED STATES PATENTS
3,810,289   5/1974   Hannabery ........................ 81/9.51

Primary Examiner—Al Lawrence Smith
Assistant Examiner—Roscoe V. Parker
Attorney, Agent, or Firm—Lyon & Lyon

[57] ABSTRACT

A mechanism employed for cutting and stripping a plurality of wires simultaneously by means of a single lever which is moved in a first direction to cut the plurality of wires and in a second direction to strip a length of insulation from the cut wires. The mechanism includes a base support and a carriage pivotally mounted thereto. The carriage supports the wire knife and anvil, the stripper knives, a cam arrangement for actuating the wire knife and stripper knives and the control lever. An automatic lock is provided which prevents the carriage from pivotting to strip the wires when the cutting operation is being performed and also prevents return of the wire knife and stripper knife when the stripping operation is being carried out. The mechanism is employed in this embodiment with wire positioning and clamping means. An assembly is used to stress the clamping means to insure the retention of the wires held therein.

3 Claims, 14 Drawing Figures

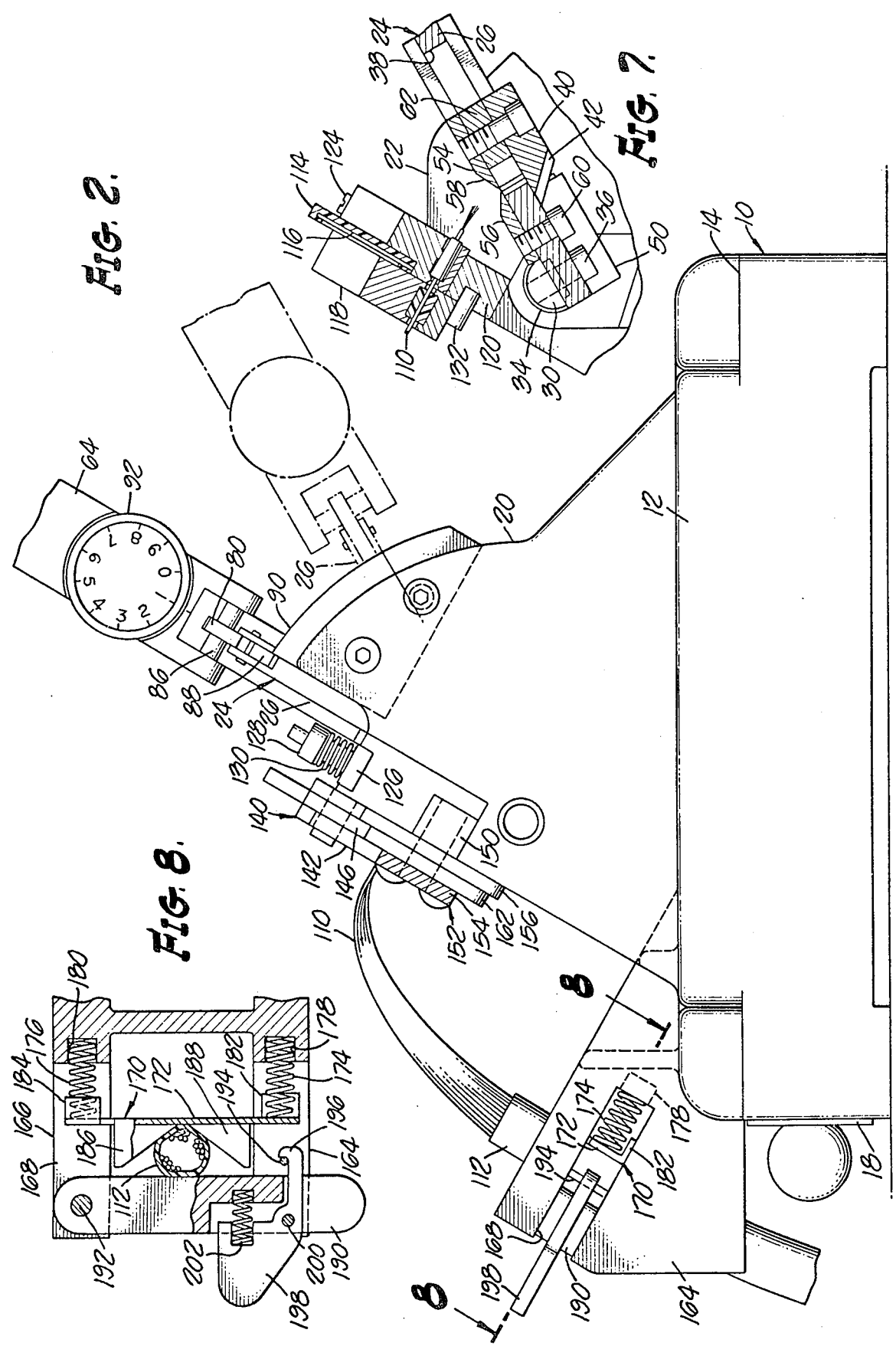

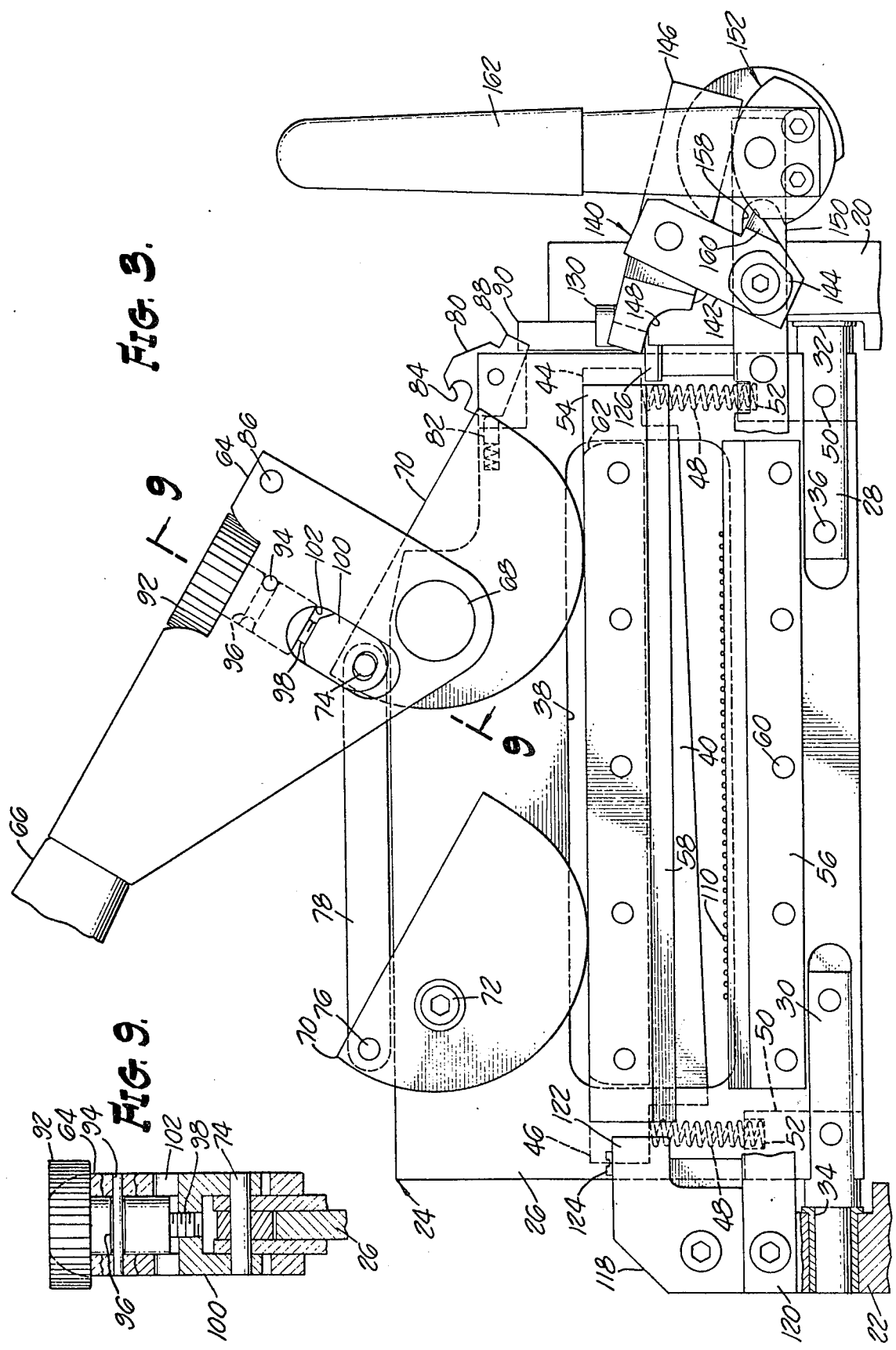

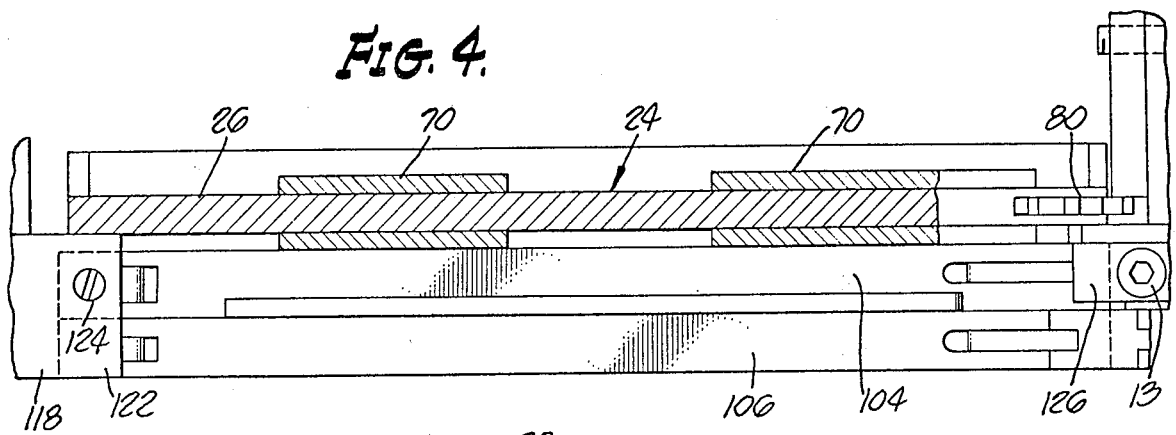
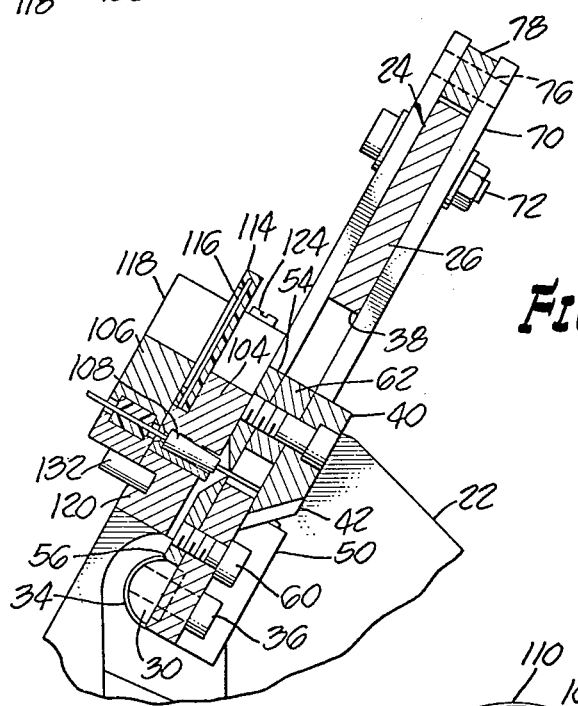
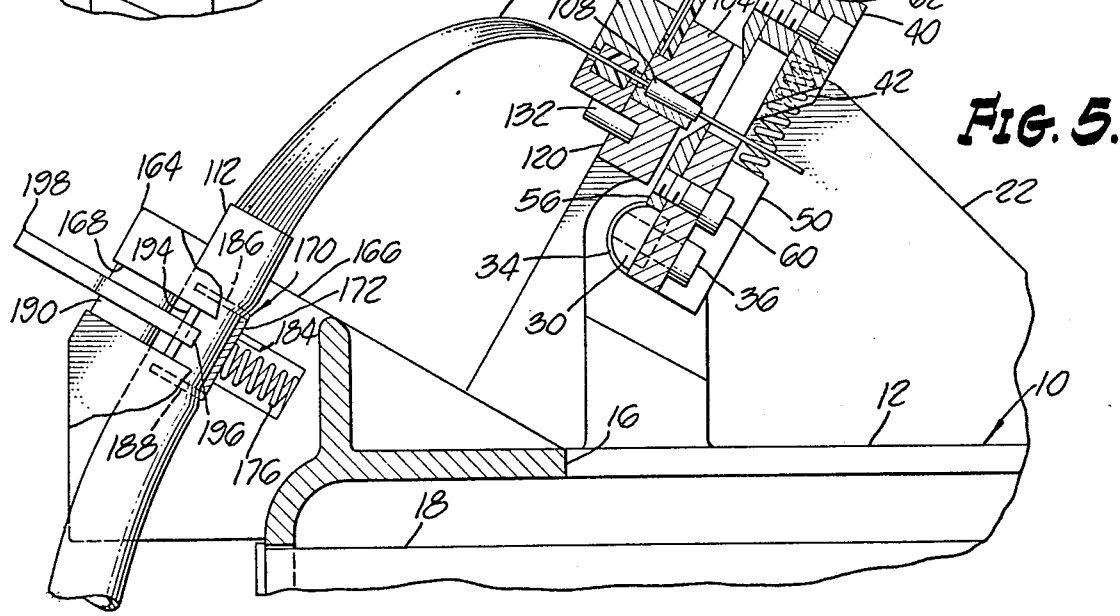

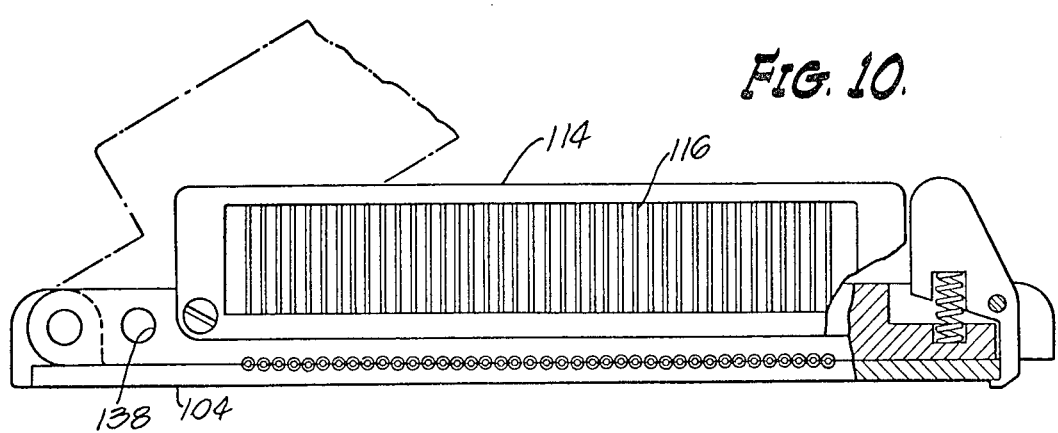
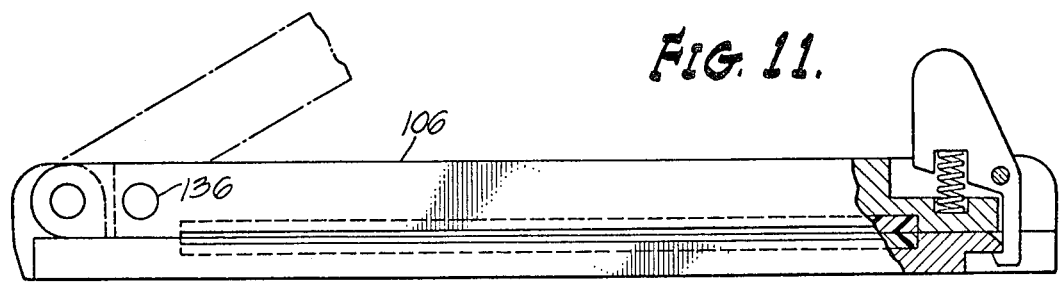
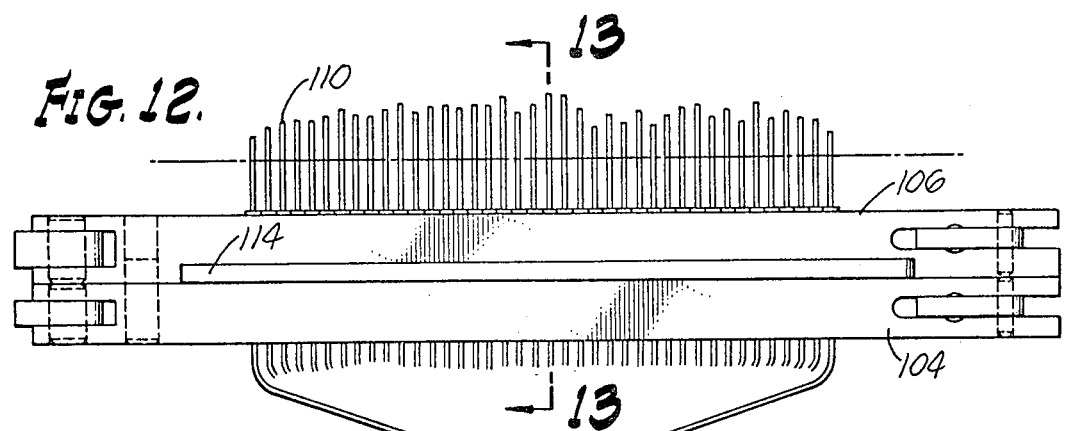
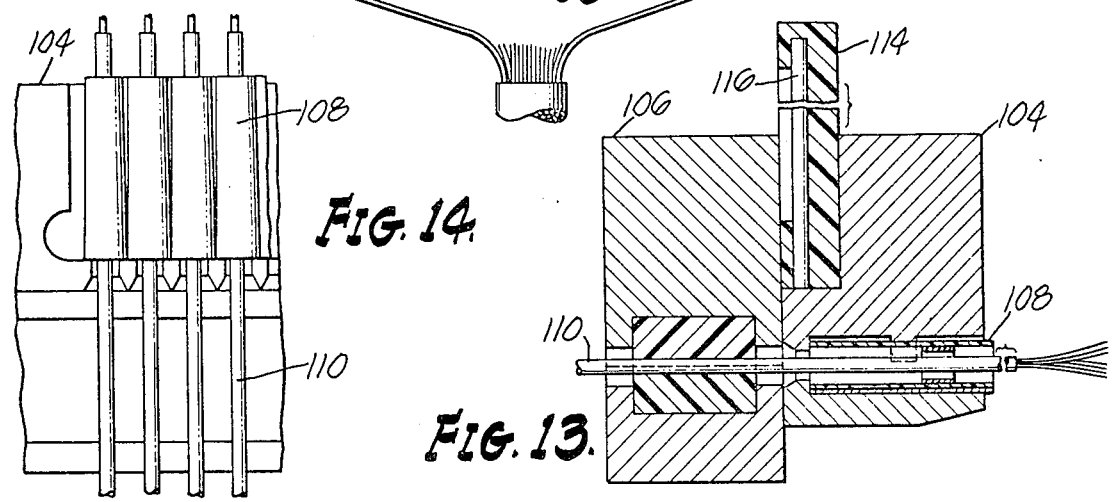

WIRE CUTTER-STRIPPER

This is a division, of application Ser. No. 442,398, filed Feb. 14, 1974, and now U.S. Pat. No. 3,916,733.

The present invention is directed to a mechanism for cutting and stripping a plurality of wires simultaneously. More specifically, the present invention is directed to a multi-wire cutter and stripper mechanism wherein the wires are first cut by moving a control lever in a first direction and the wires are stripped by moving the control lever in a second direction.

Multi-wire cutter-strippers have been found to be of great advantage for use in the fabrication of electrical systems. It is often beneficial to uniformly cut and strip the wires associated with a cable for termination with a single multi-pin connector. Such cutter-strippers generally employ a mechanism including a control arm which is drawn in one direction to first cut and then strip the plurality of wires. It therefore becomes difficult when desired to cut and not strip the wires. Further, the mechanisms are such that they often severely distort the cut and stripped wires in completing the process.

A multi-wire cutter-stripper mechanism is provided according to the present invention which allows the first simultaneous cutting of a plurality of wires through motion of a control lever in a first direction and the simultaneous stripping of the cut wires by motion of the control lever in a second direction. In this way, the cutting and stripping operation is easily and quickly completed and yet the two operations are separate and can be performed, where desired, individually. Further, the motion of the cutter-stripper when stripping the wires is such that the cut wires are not distorted, but rather, are placed in a tension condition wherein the insulation is drawn longitudinally from the wire. With the present invention, it is possible to handle a comparatively large number of wires. The present embodiment is capable of cutting and stripping up to 40 or more, 26 gage wires simultaneously. The cutter-stripper mechanism also provides an adjustment for varying the stripping position of the stripper knives in order that different wire gages may be accommodated.

An automatic locking mechanism is provided in conjunction with the base support of the mechanism, the cutter-stripper carriage mechanism, the control lever such that the cutting and stripping operations must be performed in series. In this way, it is impossible for the stripping operation to commence during the cutting of the wires. Further, it is made impossible for the cutter-stripper mechanism to retract during the stripping operation.

A cable clamp is also employed as part of the present invention which is simply constructed, easy to operate and does not require adjustment to accommodate a wide range of cable diameters. The cable clamp includes a latching mechanism cooperating with a spring loaded V-shaped clamping member. The springs loading the V-shaped member are of sufficient length to provide a clamping force which does not become excessive when employed with the larger cables contemplated for use with the system.

A holder for the wire clamp is also included with the cutter-stripper mechanism such that retention of the several wires fed into the cutter-stripper mechanism is insured. The holder places a strain in the wire clamp to more tightly compress the clamping surfaces together.

Accordingly, it is an object of the present invention to provide an improved multi-wire cutter-stripper mechanism.

It is another object of the present invention to provide a multi-wire cutter-stripper mechanism which employs a single control lever operating in two directions to first cut and then strip a plurality of wires.

It is yet another object of the present invention to provide a multi-wire cutter-stripper mechanism which is prevented from stripping during the cutting operation and from releasing the wire knife and stripper knife during the stripping operation.

A further object of the present invention is to provide an improved multi-wire cutter-stripper mechanism adapted to operations on a wide range of wire gages and suited to simultaneous cutting and stripping of a large number of wires.

Another object of the present invention is to provide a cable clamp capable of accommodating a wide range of cable diameters without any preliminary adjustment.

Another object of the present invention is to provide a holder for a wire clamp which will further insure retention of the wires while being operated upon by the cutter-stripper mechanism.

Further objects and advantages of the present invention will be made readily apparent from the following detailed description and accompanying drawings.

FIG. 2 is a side view of the present invention as seen from line 2—2 of FIG. 1.

FIG. 3 is a detailed front view of the cutter-stripper mechanism and the wire clamp locking assembly.

FIG. 4 is a cross-sectional top view taken along line 4—4 of FIG. 1.

FIG. 5 is a cross-sectional side view taken along line 5—5 of FIG. 1.

FIG. 6 is a detailed view of the cutter-stripper mechanism as seen in FIG. 5 following the cutting operation.

FIG. 7 is a detailed side view as seen in FIG. 5 following the stripping operation.

FIG. 8 is a cross-sectional plane view of the cable clamp as taken along line 8—8 of FIG. 2.

FIG. 9 is a detailed view of the stripper adjustment mechanism taken along line 9—9 of FIG. 3.

FIG. 10 is a front view of an identification block which may be included with the present mechanism for holding a plurality of wires.

FIG. 11 is a front view of a wire clamp employed with the identification block of FIG. 10 to hold the wires when operated upon by the present invention.

FIG. 12 is a plan view of the identification block of FIG. 10 and the wire clamp of FIG. 11 positioned together with wires threaded therethrough.

FIG. 13 is a cross-sectional side view taken along line 13—13 of FIG. 12.

FIG. 14 is a plan view of the lower member of the identification block of FIG. 10 with wires and terminal sleeves in position.

Figure 1:
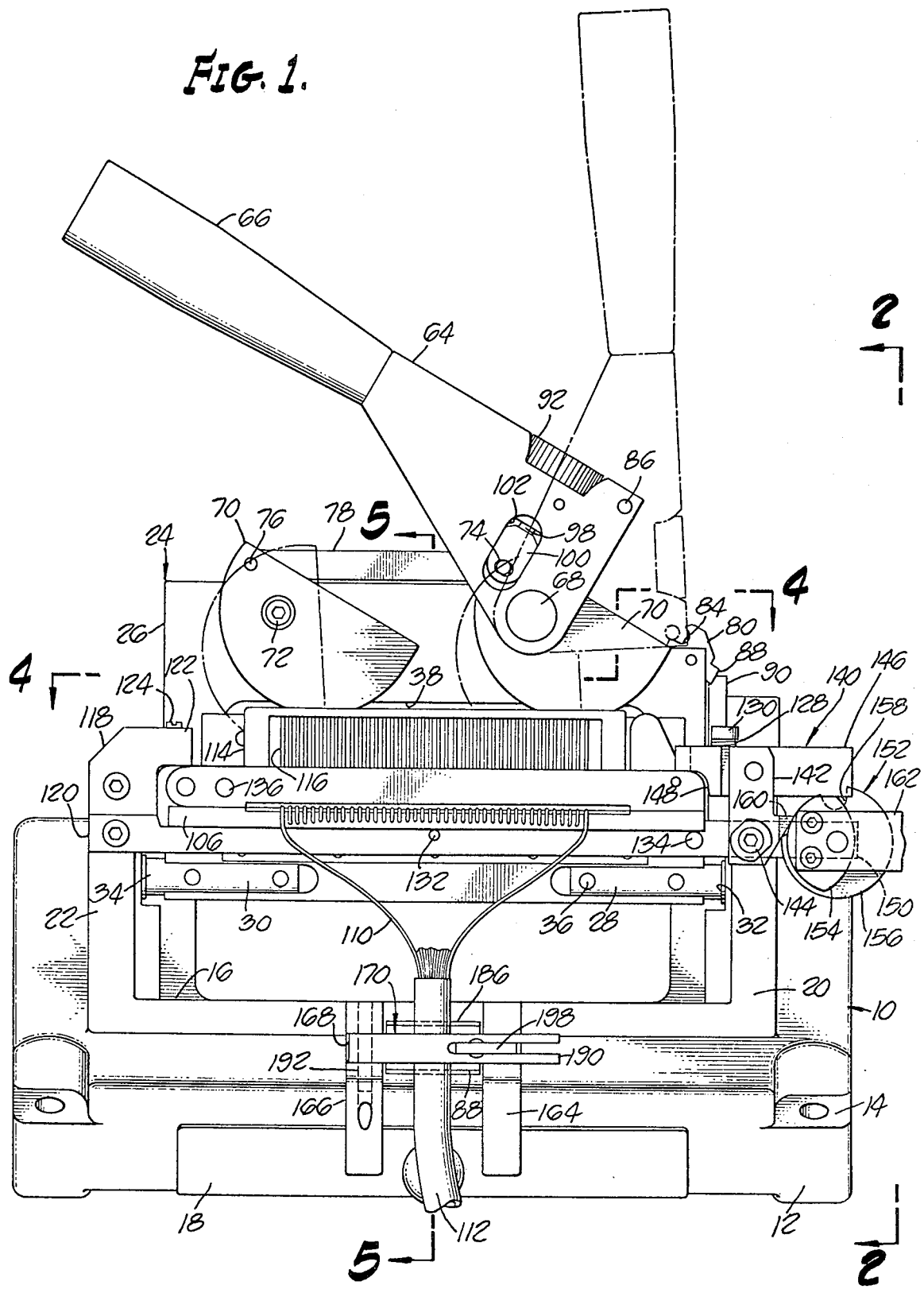
FIG. 1 is a front view of the present invention as seen from a line parallel to the plane of the cutter-stripper means.

Turning specifically to the drawings, and specifically to FIGS. 1 and 2, a base support, generally designated 10 is illustrated as including a base 12 which may be securely fastened to a work bench through four fastening locations 14. The base 12 is generally rectangular and includes a central cavity 16 extending vertically therethrough. A tray 18 is positioned within the central cavity 16 to receive the cuttings and strippings falling from the mechanism. The tray 18 may be easily removed for dumping of the various cuttings and strippings.

Forming a single casting with the base 12 are two vertical supports 20 and 22. The vertical supports 20 and 22 extend upwardly at either end of the cutting and stripping mechanisms for support thereof. The shape of each vertical support 20 and 22 is best seen in FIG. 2.

A carriage, generally designated 24, is provided on the base support and includes a carriage plate 26 pivotally mounted to the vertical supports 20 and 22 by means of pivot shafts 28 and 30. The pivot shafts 28 and 30 extend laterally to meet bushings 32 and 34 set into the vertical supports 20 and 22. The pivot shafts 28 and 30 are machined longitudinally to accommodate the carriage plate 26. Fasteners 36 locate and retain the carriage plate 26 relative to the pivot shafts 28 and 30. Thus, the carriage plate 26 is pivotally mounted to the base support 10 such that it may be rotated rearwardly as shown in phantom in FIG. 2. Mounted to the carriage plate 26 are knife means, stripper means, lever means and a cam actuation means operatively associating the lever means with the knife and stripper means. The carriage plate 26 with the various components mounted thereto is best seen in FIGS. 3 through 7. A substantially rectangular hole 38 is provided through the carriage plate 26 to facilitate the mounting of the various components.

The knife means incorporated in the present embodiment includes a cutter blade 40 which cooperates with the backside of the carriage plate 26 to move therealong. The bottom surface of the substantially rectangular hole 38 forms a shear plate to cooperate with the blade 40. The cutter blade 40 extends past the sides of the substantially rectangular hole 38 to prevent the cutter blade 40 from moving into the cavity provided by the rectangular hole 38. Extending from either end of the body of the cutter blade 40 are tabs 44 and 46. The tabs 44 and 46 cooperate with biasing compression springs 48 to bias the cutter blade 40 upwardly toward the open position. Spring supports 50 are fixed to the carriage plate 26 below the tabs 44 and 46. The spring supports include placement holes 52 for receiving and placing the lower ends of the springs 48. The cutter blade 40 has an operative cutting surface 49 along the lower portion of the cutter blade 40 which defines a cutting edge. The cutting edge is disposed at an angle relative to the lower surface of the substantially rectangular hole 38. This disposition of the cutting surface 42 operates to distribute the cutting action across a longer stroke of the cutter blade 40. The force required to shear the wires being cut is thereby reduced.

The stripper means is provided on the opposite side of the carriage plate 26 from the knife means. The stripper means includes a movable stripper knife 54 and a stripper knife 56. The movable stripper knife 54 is caused to ride on the front surface of the carriage plate 26. It also extends laterally beyond the substantially rectangular hole 38 in the carriage plate 26 in order that it will not pass through the rectangular hole 38. The movable stripper knife 54 is not biased like the cutting surface 49 of the cutter blade 40. Instead, a stripping surface 58 is provided which terminates in a stripping edge substantially parallel to the bottom surface of the substantially rectangular hole 38. The fixed stripper knife 56 is rigidly fastened by means of fasteners 60 to the carriage plate 26. The fixed stripper knife 56 is positioned relative to the substantially rectangular hole 38 in the carriage plate 26 so that the stripping edge of the knife 56 extends a short distance above the bottom edge of the rectangular hole 38 as can be seen in FIG. 3. The stripping edge of the fixed stripper knife 56 is parallel with the stripping edge of the movable stripper knife 54. In this way, the knives 54 and 56 may come almost together to partially cut the insulation associated with all of the wires being processed. The knives 54 and 56 may then be drawn along the wires to slide the insulation from the wires.

To hold both the cutter blade 40 and the movable stripper knife 54 on either side of the carriage plate 26, the two knives 40 and 54 are fastened together. A spacer plate 62 is positioned between the cutter blade 40 and the movable stripper knive 54. The spacer plate 62 is sized to fit within the substantially rectangular hole 38 and is positioned so that it will not come in contact with the top or bottom edges of the substantially rectangular hole 38 through the stroke of the cutter blade 40. The stripper plate 62 is slightly smaller in width than the substantially rectangular hole 38 in order that the cutter blade 40 and the movable stripper knife 54 cannot move laterally to any substantial degree. The thickness of the spacer plate 62 is also substantially that of the thickness of the carriage plate 26. In this way, the cutter blade 40 and the movable stripper knife 54 will be retained against either surface of the carriage plate 26 during operation of the system.

A control lever means is mounted to the carriage plate 26 for actuating both the carriage plate itself and the cutter blade 40 and movable stripper knife 44. The control lever means includes a control lever 64 having a convenient handle 66 for manual actuation of the control lever means. A cam actuation means is also provided to connect the control lever 64 with the cutter blade 40 and movable stripper knife 54. The body of the control lever 64 is split through substantially the entire center portion thereof. In this way, the control lever 64 can fit down over the carriage plate 26 as can be seen in FIGS. 1 and 2. The control lever 64 is pivotally mounted to the carriage plate 26 by means of a shaft 68. The control lever 64 may then be pivoted as illustrated by the phantom control lever shown in FIG. 1.

The cam actuation means associated with the control lever means includes four cams 70 which are pivotally mounted to the carriage plate 26. The shaft 68 serves as a pivot axis for two of the cams 70. A second shaft 72 operates as the axis for the two remaining cams 70. The cams operate as a unit because of a cam linkage system including pins 74 and 76 and a cam connector link 78. The pin 74 extends through both sides of the control lever 64, the two cams 70 and the cam connector link 78. The cams 70 are positioned within the outer walls of the control lever 64 and the cam connector link 78 is positioned between the two cams 70. The pin 76 extends through the other set of cams 70 and the cam connector link 78 located therebetween. Thus, when the control lever 64 is rotated in a clockwise direction as viewed from FIG. 1, both the control lever 64 and the four cams 70 will rotate about the two axes 68 and 72 by virtue of the pin 74 and 76 and the cam connector link 78.

The operative surfaces of the two cams on the front side of the carriage plate 26 operate on the top surface of the movable stripper knife 54. The two cams 70 on the backside of the carriage plate 26 operate on the cutter blade 40 in a like manner. The position of the axes 68 and 72 relative to the operative cam surface is such that when the control lever 64 is rotated in a clockwise direction, the four cams 70 will force the cutter blade 40 and the movable stripper knife 54 downwardly to operate on the wires located therein. The effect of this clockwise rotation of the control lever 64 is illustrated in FIGS. 5 and 6. FIG. 5 illustrates the cutter blade 40 and the movable stripper knife 54 before the control lever 64 is rotated clockwise. FIG. 6 illustrates the same assembly after the control lever 64 has been rotated to its maximum position. In FIG. 5, the wires extend between the stripper knives 54 and 56 and under the cutter blade 40. Following the clockwise rotation of the control lever 64, the wires have been trimmed at a point adjacent the back side of the carriage plate 26. Further, the stripper knives have been brought together to a point where the stripper edges of the knives cut through the insulation of the wires. The stripper knives 54 and 56 do not completely come together as they would then perform a cutting rather than a stripping function.

A locking means is provided on the carriage plate 26. The locking means includes a stripper latch 80 pivotally mounted to the carriage plate 26. A detent assembly 82, as seen in FIG. 3, may be provided for preventing the stripper latch 80 from rotating on its own. The stripper latch 80 includes a notch 84 which is positioned to cooperate with a lock pin 86 extending between the two halves of the control lever 64. As the control lever 64 is moved clockwise, the lock pin 86 engages the notch 84 in the stripper latch 80 thereby causing the stripper latch 80 to rotate counterclockwise. When the control lever 64 is rotated counterclockwise, the stripper latch 80 will rotate clockwise to release the lock pin 86. A stop 88 is formed at one side of the stripper latch 80 to cooperate with a latch track 90.

The latch track 90 is rigidly mounted to the vertical support 20 and is positioned to interfere with the stop 88 when the stripper latch 80 has been rotated by the counterclockwise movement of the control lever 64. This condition is illustrated in FIG. 3. In this condition, the control lever 64 is free to move about the shaft 68 to thereby manipulate the cutter blade 40 and the movable stripper knife 54. However, because of the interference between the stop 88 and the latch track 90, the carriage plate 26 cannot rotate about the pivot shafts 28 and 39. Consequently, the stripping action, as described hereinafter, cannot be performed during manipulation of the cutting blade 40 and the movable stripper knife 54.

Once the control lever 64 has been rotated to a point where the lock pin 86 has engaged the notch 84 and caused the stripper latch 80 to rotate counterclockwise, the stop 88 will no longer interfere with the end of the latch track 90. In this condition, there is nothing preventing the carriage plate 26 from rotating about the pivot shaft 28 and 30 relative to the base 12 and the control lever 64 may be pushed rearwardly away from the operator. Once the control lever 64 has moved any appreciable amount, the stop 88 associated with the stripper latch 80 will encounter the upper surface of the latch track 90. Having done so, the stripper latch 80 cannot be rotated clockwise, the lock pin 86 will be held in the notch 84, and the control lever 64 will be constrained from rotating counterclockwise. Consequently, the cutter blade 40 and the movable stripper knife 54 will remain in the depressed condition. Rotation of the control lever 64 and the carriage plate 26 about the pivot shafts 28 and 30 will result in the condition illustrated in FIG. 7. The movement of the carriage plate 26 and the stripper knives 54 and 56 with the movable stripper knife depressed will draw a length of insulation from the already trimmed wire. Thus, the cutting and stripping operation is completed.

If the control lever 64 were allowed to move counterclockwise about the shaft 68 during this stripping operation, the stripper knives 54 and 56 would release the length of insulation being stripped from the wire. Consequently, only a partial stripping of the wire would result. Thus, the stripper latch 80 operates to prevent a stripping action during the cutting of the wires and the positioning of the stripper knife and will prevent release of the cutter blade 40 and the movable stripper knife 54 during the stripping operation. This is all done automatically without any further manipulation by the operator. The operator simply must grip the handle 66 and move it first clockwise and then rearwardly to effect a cutting and stripping of the wires placed in the mechanism.

The relative placement of the movable stripper knife 54 and the fixed stripper knife 56 must be controlled for the stripping operation in order that the stripping edges of the stripper knives 54 and 56 will enter the insulation to obtain sufficient purchase for drawing the instulation from the wire. At the same time, if the stripper blades 54 and 56 come too close together, the metal will be damaged or cut off. To provide an established index preventing the movable stripper knife 54 from cutting the wires, the carriage plate 26 extends about the stripper latch 80 to form an upper surface which will also engage the lock pin 86 thus preventing further rotation of the control lever 64 in a clockwise direction.

However, it is advantageous that the stroke of the movable stripper knife 54 be variable so that the mechanism may be employed with wires of different wire gages. To increase the versatility of the present system, an adjustment assembly is included within the control lever 64 which will vary the orientation of the cams 70 with respect to the control lever 64. The adjustment assembly is best seen in FIGS. 3 and 9. The object of the adjustment assembly is to allow, through manipulation of an adjustor thumbscrew 92, the relative rotation of the control lever 64 about the shaft 68 a small degree without moving the cam actuation means. The adjustor thumbscrew 92 is retained in its position in the control lever 64 by means of a lock pin 94 cooperating with a groove 96. The adjustor thumbscrew 92 extends to a threaded shaft 98 which is caused to rotate with the adjustor thumbscrew 92. The threaded shaft 98 extends through a clevis 100 positioned in cutouts 102 provided through the walls of the control lever 64. The fit between the clevis 100 and the cutouts 102 prevents the clevis from rotating with the adjustor thumbscrew 92. Consequently, manipulation of the adjustor thumbscrew 92 will cause the clevis 100 to move in the cutouts 102 relative to the control lever 64. The pin 74 extends across the clevis 100 through the cams 70 and cam connector link 78 as discussed above. By manipulating the adjustor thumbscrew 92, the control lever 64 may thereby be moved relative to the cam actuation means. This will in turn adjust the final cam positioning 70 with the control lever 64 rotated clockwise as far as possible. By moving the clevis 100 toward the adjustor thumbscrew 92, the spacing between the movable and fixed stripped knives is reduced. By moving the clevis 100 away from the adjustor thumbscrew 92, a larger stripping gap will result. In this way, the system may be adjusted to accommodate variations in the gage of the wires stripped.

The positioning of the wires in the cutter stripper mechanism is, in the present embodiment, designed to be accomplished by an identification block 104 as set out in FIGS. 10 and 12 through 14. Further, a wire clamp 106 as illustrated in FIGS. 11 through 14 is employed. The identification block 104 and the wire clamp 106 are move fully disclosed in a copending application filed concurrently herewith in the name of Siden et al, entitled Method and Apparatus for the Simultaneous Termination in Terminal Sleeves of a Plurality of Wires with a Multipin Connector Ser. No. 442,580, filed Feb. 14, 1974, the disclosure of which is incorporated herein by reference. The wire clamp includes hinged jaws with mating surfaces for holding a plurality of wires.

Broadly, the identification block 104 is employed to position and hold terminal sleeves 108 as shown in FIG. 14. The appropriate wires 110 extending from a cable 112 are threaded through the identification block 104 and consequently through the terminal sleeves 108. This threading of the various wires 110 may be accomplished with the identification block 104 positioned on the cutter-stripper. To facilitate the placement of the appropriate wires 110 through the right terminal sleeves 108, a coded wire identification card 112 may be employed. Coded lengths of wire 116 are positioned in the identification card 114 which correspond with the coding on the individual wires to be threaded through the appropriate terminal sleeves 108. Once the wires 110 are positioned through the identification block 104, wire fan is pulled tight and the wire clamp 106 applied thereto. As with the identification block 104, the wire clamp 106 may be positioned about the wires 110 by positioning the wire clamp on the cutter-stripper mechanism. The identification block 104 and the wire clamp 106 will then position and hold the several wires 110 for cutting and stripping.

An identification block locater 118 is provided on one side of the base support 10. Immediately therebelow and extending full length across the face of the system is an identification block locater beam 120. As can be seen in FIG. 5, the identification block locater 118 extends outwardly from the base support 10 to engage both the identification block 104 and the wire clamp 106. The identification block locater beam 120 only extends to a position capable of supporting the identification block 104. The identification block locater 118 includes an arm 122 which extends over the position identification block 104 and wire clamp 106 having a surface for preventing upward movement of identification block 104 and wire clamp 106. The inside surface of the body of the locater 118 positions the end of the identification block 104 and the end of the wire clamp 106. A spring loaded detent 124 is positioned through the arm 102 of the identification block locater 118 to frictionally engage the upper surface of identification blocks 104.

At the other end of the base support 10, the identification block 104 is constrained between the identification block locater beam 120 and a spring loaded arm 126. The spring loaded arm 126 must be moved slightly upward to accommodate the identification block 104 between the spring loaded arm 126 and the identification block locater beam 120 thus creating resilient retention of the identification block 104. A spring 128 and fastener 130 are employed to create the spring loading in the arm 126.

A holder is provided for the wire clamp which creates a bending moment on the wire clamp for insuring retention of the several wires being operated upon by the cutter-stripper mechanism. As indicated above, the wire clamp 106 is partially positioned by the identification block locater 118. However, the wire clamp 106 does not encounter the identification block locater beam 120 which does form a support for the holder. Instead, a pin 132 extends from the identification block locater beam 120 upon which the lower surface of the wire clamp 106 rests. A second pin 134 also extends from the identification block locater 120 to support the right hand end of the cable clamp 106. Further, a pin 136 is located in the wire clamp 106 and extends rearwardly to engage a hole 138 in the identification block 104. The structure of the wire clamp 106 is such that a bending motion will result when a moment is applied to the bar clamp 106. This feature is employed by the present apparatus to insure that all wires 110 extending through the wire clamp 106 will be held tightly. The arm 122 of the identification block locator 118, the pin 132 and a wire clamp locating mechanism, generally designated 140, cooperate to create a bending moment in the wire clamp 106. The arm 122 and the wire clamp locating mechanism 140 press downwardly on the wire clamp 106 while the pin 132 presses to resist this downward motion. Consequently, the lower jaw of the wire clamp 106 is forced upwardly in the middle to insure the rigid clamping of all wires 110.

The wire clamp locator mechanism 140 includes an arm 142 pivotally mounted about a shaft 144 attached to the vertical support 20. The arm 142 extends upwardly to pivotally engage a wire clamp latching member 146. The wire clamp latching member 146 includes a radius portion 148 for engagement of the wire clamp 106. A rigidly positioned arm 150 extends outwardly to pivotally support an actuating mechanism generally designated 152. The actuating mechanism 152 includes a first cam 154 for engaging the underside of the wire clamp locking member 146. This first cam 154 acts to forcibly rotate and constrain the wire clamp locking member 146 against the end of the wire clamp 106. In FIG. 1, the first cam 154 is shown forcibly holding the wire clamp locking member 146 against the end of the wire clamp 106. In FIG. 3, the first cam 154 has been rotated to allow the wire clamp locking member 146 to disengage the wire clamp 106. A second cam 156 also forms part of the actuating mechanism 152. This second cam 156 includes a notch 158 designed to engage an extended portion 160 of the pivotally mounted arm 142. In this way, when the first cam 154 is rotated to allow the wire clamp locking member 146 to retract from the wire clamp 106, the second cam 156 will be rotated thereby causing the notch 158 to engage the extended portion 160 of the arm 142 and rotate the arm 142 away from the wire clamp 106. A handle 162 is positioned to rotate with the first and second cams 154 and 156. In this way, the wire clamp 106 may be quickly released or engaged and forcibly held by the wire clamp locating mechanism 140.

Once positioned, the wire clamp 106 and the identification block 104 will position and hold the various wires 110 for operation of the cutting and stripping mechanism. Specifically, when the wires are located by the identification block 104, they will be sufficiently arranged such that the knife means can uniformly cut the ends of the wires 110 to make them the appropriate length for termination with a multipin connector. Further, the clamping of the wires in the wire clamp 106 will operate to resist the tension loading placed on the wires 110 when the stripper means is actuated.

A clamping means for clamping the cable 112 is provided on the front portion of the base support 10. The clamping means is illustrated in FIGS. 1, 2, 5 and specifically in FIG. 8. The clamping means includes two parallel members 164 and 166 extending from the base support 10. The members are spaced to accommodate a cable and the clamping mechanism. A slot 168 extends through each of the two parallel members 164 and 166. A V-shaped clamping member 170 is positioned within the slot 168 to span the distance between the members 164 and 166. The V-shaped clamping member 170 includes a base 172 which extends to engage compression spring 174 and 176. The compression springs 174 and 176 are located in recesses 178 and 180 formed in the ends of the slot 168. Tabs 182 and 184 extend down the side of the springs 174 and 176 respectively to prevent pivotal movement of the V-shaped clamping member 170 about the base 172. V-shaped teeth 186 and 188 extend toward the cable position from the base 172. The V-shaped given to the teeth 186 and 188 accommodates a large range of cable sizes and yet ends to tightly grip the cable 112 located therein.

A locking mechanism including a pivotally mounted arm 190 is positioned at the ends of the members 164 and 166. The arm is pinned at 192 to the member 166. A pin 194 extends across the slot 168 to cooperate with a hook 196 formed on one end of a latch 198. The latch 198 is pivotally mounted to the arm 190 at pin 200. A spring 202 biases the latch 198 in the locked position.

The locking means is easily operated by unlatching the latch 198 and swinging the arm 190 away from the locked position. A cable 112 may then be easily positioned between the members 164 and 166 and forced against the teeth 166 and 168. The arm 190 is then rotated so that the latch 198 will lock over the pin 194. In this way, the cable is secured and the wires may then be deployed in the identification block 104.

Thus, a means is provided for cutting and stripping a plurality of wires, the operation of which is simply and quickly performed by the operator. Further, the mechanism acts to avoid errors, misalignments and the like such that a high quality job may be repeatedly performed to properly condition wires for termination with a multipin connector or other electrical component.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A holder for a wire clamp of the type having hinged jaws with mating surfaces for holding a plurality of wires, the holder comprising
    a support;
    a stop positioned on said support and located to prevent movement of a first end of the wire clamp in a first direction;
    a pin positioned on said support and located essentially adjacent the wire clamp to prevent movment of a wire clamp in a second direction opposite to said first direction; and
    a wire clamp locating mechanism positioned on said support and capable of forcefully stressing the wire clamp at the second end of the wire clamp in said second direction, thereby causing the wire clamp to distort to further securely hold wires located therethrough.

2. The holder of claim 1 wherein said stop, said pin and said wire clamp locating mechanism are positioned to receive a wire clamp with the mating surfaces oriented perpendicular to said first and said second directions.

3. The holder of claim 1 wherein said wire clamp locating mechanism includes a first arm pivotally mounted to said support, a second arm pivotally mounted to said first arm and oriented to extend perpendicular to said first arm, said second arm extending in a first direction toward the wire clamp, said first arm and said second arm being positionable to place said second arm extending in said first direction on the wire clamp; and
    means for forcing said second arm to pivot against the wire clamp to distort the wire clamp.

* * * * *